United States Patent [19]

Phillips

[11] 4,331,374

[45] May 25, 1982

[54] COAXIAL TERMINATION FOR CABLE IN-LINE ELECTRONIC APPLICATIONS

[75] Inventor: Raymond J. Phillips, Oakdale, Conn.

[73] Assignee: The United States of America as represented by the Secretary of the Navy, Washington, D.C.

[21] Appl. No.: 171,860

[22] Filed: Jul. 24, 1980

[51] Int. Cl.[3] .......... H01R 4/22; H02G 15/02

[52] U.S. Cl. .......... 339/177 E; 174/75 C; 174/89

[58] Field of Search .......... 339/177 R, 177 E, 89 C, 339/94 C, 95 R, 95 D; 174/89, 88 C, 78, 75 C, 75 R

[56] References Cited

U.S. PATENT DOCUMENTS

| | | | |
|---|---|---|---|
| 2,719,279 | 9/1955 | Muckler | 339/177 E |
| 3,001,169 | 9/1961 | Blonder | 339/95 R X |
| 3,195,098 | 6/1965 | Miller et al. | 174/75 C X |
| 3,292,136 | 12/1966 | Somerset | 339/177 E |
| 3,448,430 | 6/1969 | Kelly | 174/78 X |
| 3,526,871 | 9/1970 | Hobart | 339/177 E |
| 3,622,939 | 11/1971 | Forney, Jr. | 339/177 E X |
| 3,706,958 | 12/1972 | Blanchenot | 339/177 E |
| 3,833,754 | 9/1974 | Philibert | 174/78 X |
| 4,022,966 | 5/1977 | Gajajiva | 339/14 R |
| 4,156,554 | 5/1979 | Aujla | 339/177 R |

*Primary Examiner*—John McQuade
*Assistant Examiner*—John S. Brown
*Attorney, Agent, or Firm*—Robert F. Beers; Arthur A. McGill

[57] ABSTRACT

A cable terminator assembly for a coaxial cable includes a housing having a braided extension affixed thereto for transferring tensile strength from a cable to the housing and braided extension. An inner cylindrical piece is swaged to the housing for holding the braided extension in place. A dielectric clamp with a closure ring, flat locking washer and cap complete the components within the termination. The washer is keyed to the housing and, together with the housing, clamp the stranded cable conductor. The keying prevents turning of the mating components so that the stranded cable conductor will not be damaged. The clamping of the strands makes electrical contact between the strands and the assembly. The dielectric clamp is forced to bite into the dielectric material of the coaxial cable. This provides a firm mechanical hold.

10 Claims, 3 Drawing Figures

COAXIAL TERMINATION FOR CABLE IN-LINE ELECTRONIC APPLICATIONS

STATEMENT OF GOVERNMENT INTEREST

The invention described herein may be manufactured and used by or for the government of the United States of America for governmental purposes without the payment of royalties thereon or therefor.

BACKGROUND OF THE INVENTION

The present invention generally relates to an electrical cable termination and more particularly to a device for terminating a coaxial cable in an in-line assembly that is compatible with a plurality of existing antenna systems now in use aboard submarines.

One of the requirements of in-line equipment, such as connectors, terminations, fittings, and housing in many systems is that the components do not exceed the diameter of the cable or wire that is to be used in conjunction with the components. This enables each component to be compatible with the existing stuffing tubes, seals, and mechanisms that are normally found. In addition, an optimum connector for in-line equipment should be flexible, have good tensile strength, inhibit rotation to prevent the breaking of electrical connections and provide mechanical grounding of outer braided conductor of coaxial cable.

In comparison to the present invention, prior art connectors are generally heavy, are less flexible, have less tensile strength and do not inhibit rotational force in the area of the electrical connections.

SUMMARY OF THE INVENTION

It is therefore a general object of the present invention to provide an improved connector for an electrical coaxial cable. Additionally, the connector is designed to meet the requirements previously listed for in-line equipment. These and other objects of the inventions and the various features and details of construction and operation will become apparent from the specification and drawings.

This is accomplished in accordance with the present invention by providing a cable termination assembly having a braided extension for gripping a connected coaxial cable. The coaxial cable has a portion of its outer jacket removed and has its outer stranded conductor fanned and held in place inside the termination assembly by an arrangement of components designed for this purpose. An improved contact is made between the strands and the connector termination resulting in better and more efficient pass-through of RF signal or other current. The combination of cable and termination assembly is not affected by normal cable twisting, flexing or tension. In addition, it is less affected by seawater or any environmental oxidation than previous designs.

DESCRIPTION OF THE PREFERRED EMBODIMENTS

Figure 1:
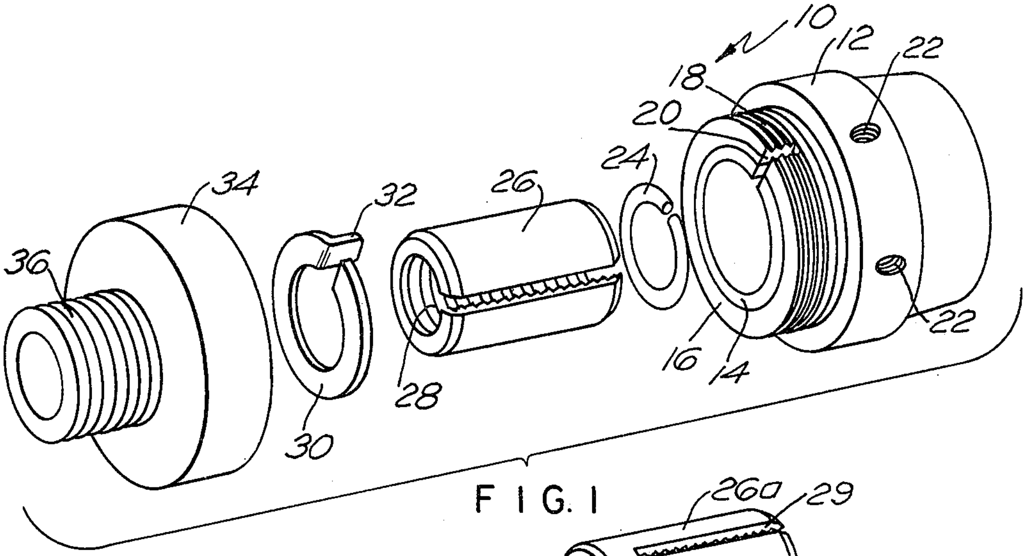
FIG. 1 is an exploded view of a cable termination assembly in accordance with the present invention.

Referring now to FIG. 1 there is shown a cable termination assembly 10. The cable termination assembly 10 is suitable to replace the end piece described by Phillips and Susi in U.S. Pat. No. 4,166,921 when a coaxial cable is to be terminated.

The cable termination assembly 10 is comprised of a housing 12 having inner piece 14 and outer piece 16 swaged together. The housing 12 has a threaded front end 18 having a keying slot 20. A plurality of threaded apertures 22 extend through both inner piece 14 and outer piece 16.

The termination assembly 10 further includes a split dielectric clamp closure ring 24 that is inserted inside housing 12. Abutting closure ring 24 inside housing 12 is a slotted dielectric clamp 26 having a sawtooth inner surface 28. A split flat locking washer 30 has a key 32 for insertion in slot 20. A cap 34 is screwed onto the threaded front end 18 of housing 12 and abuts washer 30. The cap 34 has its own threaded end 36.

Figure 2:
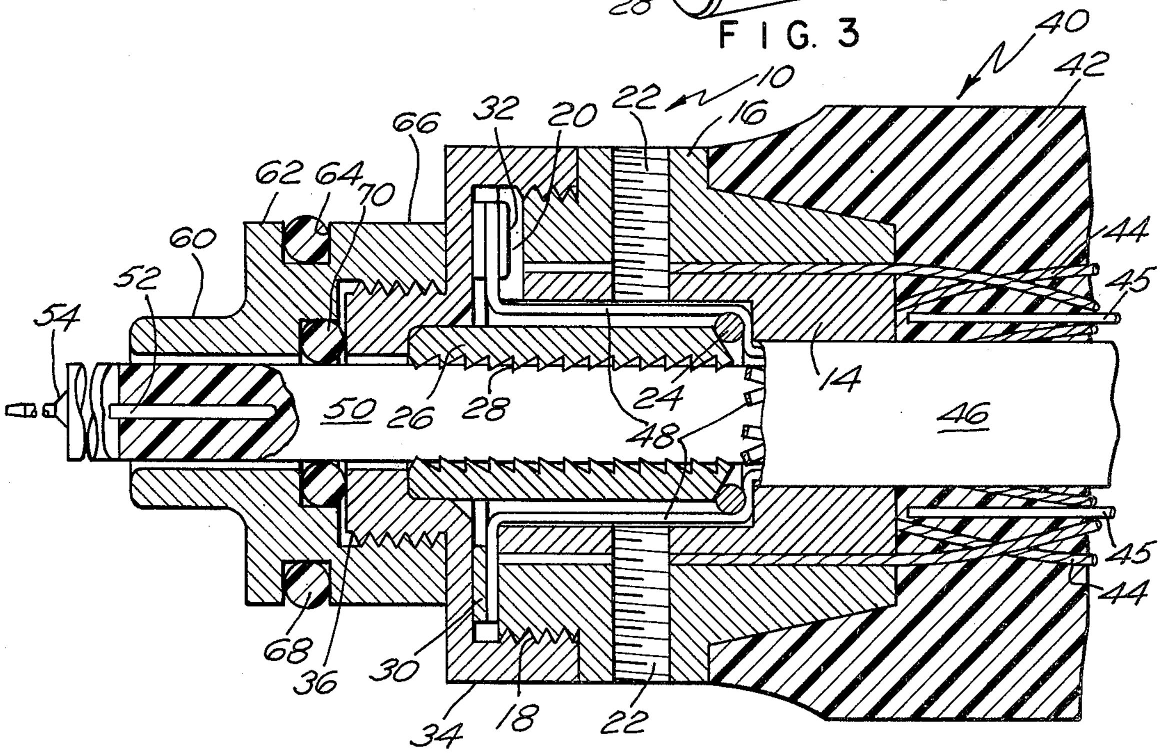
FIG. 2 is a sectional view of the cable termination assembly of FIG. 1 affixed to a coaxial cable and retainer.

Referring now to FIG. 2 there is shown the cable termination assembly 10 affixed to coaxial cable 40 and a retainer 60. The retainer 60 and its connection in the system are shown in more detail in the previously mentioned U.S. Pat. No. 4,166,921.

The coaxial cable 40 includes an outer jacket 42 of foamed polyethylene. Embedded in the jacket 42 is a braided cable grip 44. The braided cable grip 44 is necessary to transfer strength from the strength members 45 of the cable to termination assembly 10. Inside the jacket 42 and grip 44 is a thin polyethylene sheath 46. Next are the braided strands of outer conductor 48. Then comes the dielectric covering 50 that encloses an inner conductor 52. Affixed to the end of conductor 52 is contact 54.

In assembling coaxial cable 40 to cable termination assembly 10 the cable center conductor 52, dielectric 50 and the braided strands of outer conductor 48 are inserted into housing 12. The dielectric clamp closure ring 24 is slipped down the dielectric 50 and between the dielectric 50 and braided strands 48 as far as possible. The braided strands 48 are now fanned out radially. The slotted dielectric clamp 26 is then inserted until it abuts the closure ring 24. The washer 30 is now put in place and the braided strands 48 are trimmed off at the outer diameter of washer 30. Washer 30 must have the key 32 engaged in slot 20 of housing 12. The washer 30 is now prevented from turning as cap 34 is then threaded onto housing 12. If washer 30 were permitted to turn braid strands 48 could be pinched off during the connecting of cap 34. The purpose of the washer 30 is to clamp the braided strands 48 and thus passes a solid electrical continuity from braided strands 48 to cable termination assembly 10. The installation of the cap 34, in addition to clamping washer 30 to braided strands 48, forces the dielectric clamp 26 against the closure ring 24. This forces the clamp 26 radially inward, biting into the clamping onto the dielectric material 50 of the cable 40.

The stainless steel O-ring retainer 60 having a flange 62, neck portion 64 and head 66 holds O-ring 68 on its neck portion 64. The head 66 is screwed onto threaded end 36 of cap 34. An O-ring 70 forming a seal is inserted between threaded end 36 and retainer 60.

Figure 3:
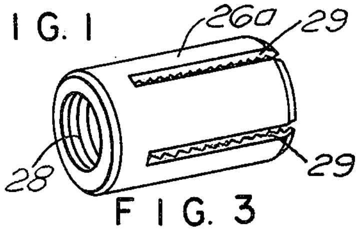
FIG. 3 is a view of an alternate style clamp.

FIG. 3 shows an alternate style clamp **26*a* having a sawtooth inner surface 28*a* and a plurality of slots 29**.

There has therefore been described a coaxial termination that has an improved contact between the braided outer conductor 48 and the cable termination assembly 10. This termination results in more efficient conduction of an RF signal or other current. The termination minimizes chances of physical or environmental damage. A dielectric clamping action and cable braid 48 contact are achieved simply, efficiently and simultaneously. These novel features are compatible with existing and current systems. The entire changes being internal to current terminations, thereby minimizing the impact on present systems. All current buoyant cable antenna systems are suitable for upgrading both mechanically and electrically, at overhaul or during regular antenna or cable refurbishing, by the incorporation of the design.

It will be understood that various changes in the details, materials, steps and arrangement of parts, which have been herein described and illustrated in order to explain the nature of the invention may be made by those skilled in the art within the principle and scope of the invention as expressed in the appended claims.

What is claimed is:

1. A coaxial cable terminator comprising:

a housing having a keying slot, said housing having an axial aperture adapted to receive a coaxial electrical cable;

a closure ring adapted to be inserted in the axial aperture of said housing;

a slotted dielectric clamp having a gripping inner surface adapted to abut said closure ring in the axial aperture of said housing;

a washer having a key adapted to mate with said keying slot of said housing; and a cap having an axial aperture, said cap adapted to mate with said housing with the axial aperture of said cap aligned with the axial aperture of said housing.

2. A coaxial cable terminator according to claim 1 wherein said housing further comprises:

an inner and outer piece adapted to be swaged together; and a threaded outer surface at one end having said keying slot.

3. A coaxial cable terminator according to claim 2 wherein said slotted dielectric clamp gripping inner surface comprises a sawtooth surface.

4. A coaxial cable terminator according to claim 3 wherein said cap further comprises:

an inner threaded surface at one end adapted to mate with said housing threaded outer surface; and an outer threaded surface at the other end.

5. A coaxial cable termination comprising:

a coaxial electrical cable having an inner conductor, a dielectric covering enclosing said inner conductor, an outer stranded conductor enclosing said dielectric covering and electrical insulation material enclosing said outer stranded conductor;

a housing having a keying slot, said housing having an axial aperture receiving at least said stranded conductor, said dielectric covering and said inner conductor;

a closure ring inserted in the axial aperture of said housing, said closure ring being inserted over said dielectric covering and under said outer stranded conductor;

a slotted dielectric clamp having a gripping inner surface gripping said dielectric covering, said slotted dielectric clamp abutting said closure ring in the axial aperture of said housing under said outer stranded conductor;

a washer having a key mating with said keying slot of said housing, said stranded conductor being held and terminated between said washer and said housing;

a cap having an axial aperture, said cap mating with said housing with the axial aperture of said cap aligned with the axial aperture of said housing;

a retainer having an axial aperture, said retainer connected to said cap, said retainer enclosing said dielectric covering and said inner conductor of said cable; and a contact affixed to an end of said inner conductor of said cable.

6. A coaxial cable termination according to claim 5 further comprising an O-ring located between said cap and said retainer, said O-ring enclosing said dielectric covering and said inner conductor of said cable.

7. A coaxial termination according to claim 6 further comprising:

said electrical insulation material further includes an electrical insulating sheath enclosing said outer stranded conductor and a jacket enclosing said sheath; and a braided cable grip embedded in said jacket.

8. A coaxial termination according to claim 7 wherein said housing further comprises an inner and outer piece swaged together with an end of said braided cable grip sandwiched therebetween.

9. A coaxial cable termination according to claim 8 wherein said slotted dielectric clamp gripping inner surface comprises a sawtooth surface.

10. A coaxial cable termination according to claim 9 wherein said cap further comprises:

an inner threaded surface at one end mating with said housing threaded outer surface; and an outer threaded surface at the other end.

* * * * *